May 15, 1962 A. P. JACKEL 3,035,249
CODE CHECKING MEANS FOR REMOTE CONTROL SYSTEMS
Filed Aug. 11, 1958
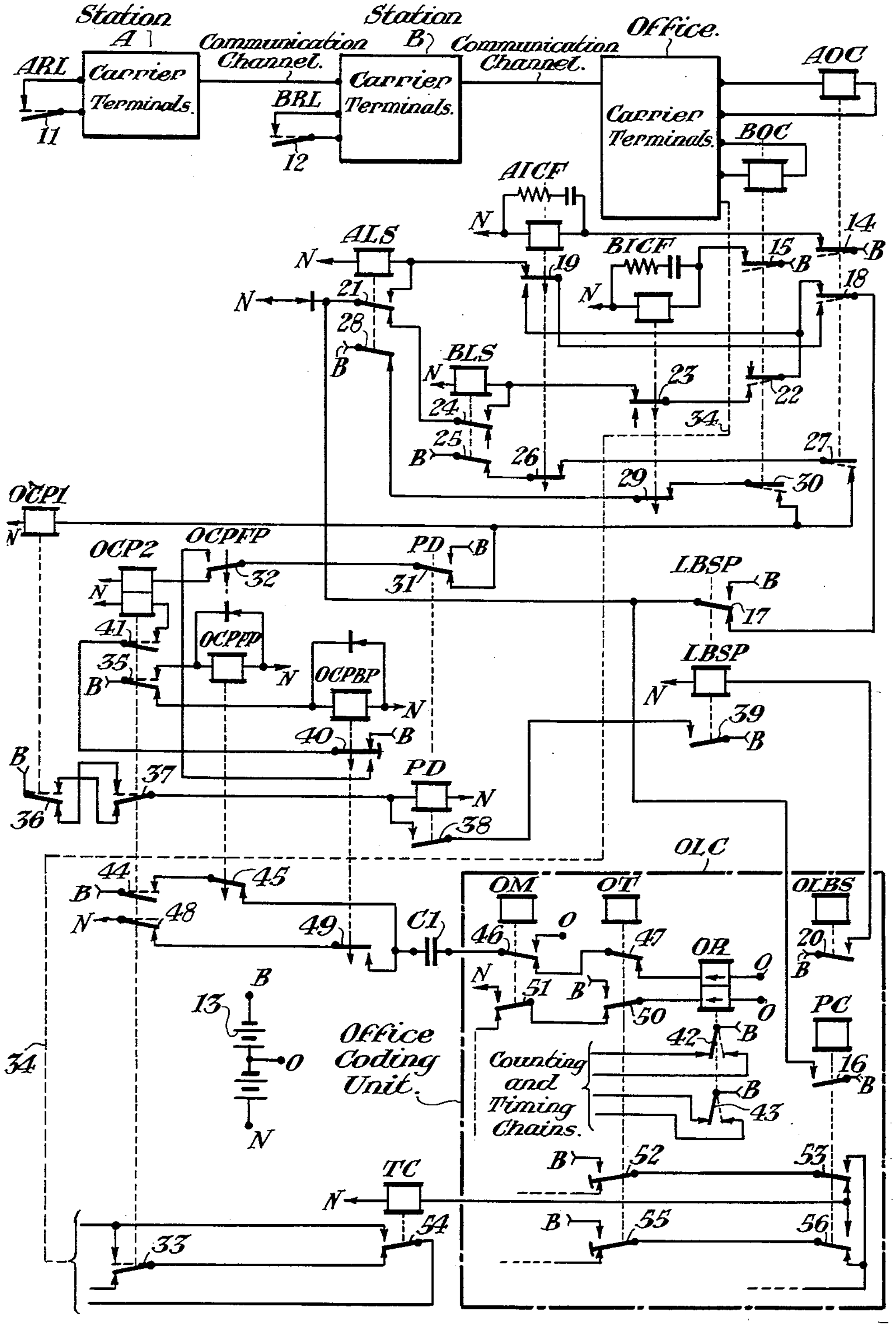

3,035,249
CODE CHECKING MEANS FOR REMOTE CONTROL SYSTEMS

Arthur P. Jackel, Penn Hills Township, Allegheny County, Pa., assignor to Westinghouse Air Brake Company, Wilmerding, Pa., a corporation of Pennsylvania Filed Aug. 11, 1958, Ser. No. 754,318
10 Claims. (Cl. 340—163)

My invention relates to code checking means for remote control systems. More particularly, my invention relates to a spurious pulse check circuit arrangement to detect and reject incorrect short code steps received over a communication channel in a coded remote control system.

Any remote control system, in which codes are transmitted over a direct current line circuit or over any form of carrier channel, is subject to the introduction of spurious pulses into a transmitted chain of code steps. These spurious code pulses may be caused by momentary or intermittent line or circuit faults or may be induced by external disturbances such as power line faults, lightning, and other phenomena. One result of such code interruptions is the introduction of additional code steps by dividing one of the normal code steps into two or more portions. For example, in one type of system in general use in which long and short code steps, of either energy-on or energy-off character, are transmitted over the communication channel in use, such circuit faults or external disturbances may divide a long energy-on code step into three very short periods of which two correspond to On code steps and one to an Off code step. Conversely, a long Off code step may be broken into two very short Off periods separated by a very short On period. Another error which may result from such spurious pulses is the changing of the character of a single received code step. In the code system described above, even though a spurious pulse received during a long code step may be too short to actuate the counting chain relays to register another code step, the pulse timing relays are briefly reenergized and, thus resaturated, fail to release to indicate a long code step. The step is then erroneously recorded as a short code step and an incorrect indication results.

Such remote control systems may be designed to finally reject any codes which contain extra code steps and to effect the restarting of the code for correct transmission. These rejection means are based on counting the total number of steps received so that division of any one normal step into the plurality of very short parts causes the predetermined total count to be exceeded and the code rejected. However, detection of a single altered coded step cannot be assured if the code system remains in synchronism in spite of the spurious pulse. Under these conditions, the total number of received code steps does not exceed the predetermined total and the overcount check is thus ineffective.

If the received information is being registered or logged into a visual and permanent record as it is received, both altered and added incorrect code steps caused by an induced circuit pulse will result in erroneous information being logged. Although this indication may be recognized as erroneous, it still appears in the permanent record and results in later confusion. The logging of such received information, particularly during indication codes, is quite common in some types of system operation, for example, in pipeline control systems. It is very desirable, therefore, to be able to halt the coding action immediately if an incorrect, very short code step is received as a result of a spurious pulse being introduced into the communication channel in use. That is, if a code step shorter than any of the regular code steps used in the system is received, coding action should be immediately halted and the information rejected. This may be accomplished by providing an arrangement to recognize such very short code steps and lock out the coding unit at the receiving location, thus preventing the registry of the erroneous information received during the fault period. Such lockout action also causes the system to reset and again transmit the code.

Accordingly, it is an object of my invention to provide a code checking means for remote control systems to detect erroneous code pulses introduced into the system.

It is also an object of my invention to provide a circuit arrangement in a remote control system which will detect the reception of incorrect and erroneous very short code pulses and immediately lock out the receiving station.

A further object of my invention is a pulse checking circuit arrangement at the office location in a remote control system to detect the reception of a spurious short pulse resulting from a fault in the communication channel and to lock out the coding unit to prevent the registry of incorrect indications.

Still another object of my invention is a code check means in a remote control system to effect immediate rejection of codes containing spurious code pulses caused by fault conditions in the communication channel.

It is also an object of my invention to provide a code check means in a remote control system to prevent the logging of incorrect indications which result from code interference caused by faults or spurious pulses introduced into the communication channel.

Other objects, features, and advantages of my invention will become apparent from the following description when taken in connection with the accompanying drawing.

Referring now to the single FIGURE of the drawing, shown therein diagrammatically is one form of the code checking circuit means of my invention in conjunction with a particular coded remote control system.

In practicing my invention, I supply two repeater relays for the code following line relay at the office location. In the particular form shown, in which the remote control system is of the coded carrier current type, the line relay is the office carrier receiving relay, there being one such relay for each indication carrier circuit. It will be understood, of course, that direct current line circuits may be used and the line relays accordingly recircuited in any well-known manner. The two repeater or code receiving relays normally operate in multiple to follow the received code directly. Stated another way, as arranged by my invention, the code receiving relays actually receive the code from the communication channel means through the carrier receiver or line relays and in turn control the code unit which receives and registers the information. The second receiving relay also drives a front and a back contact repeater relay. Each of these contact repeater relays is provided with similar slow release characteristics and has a release time slightly less than the length of a normal short code step in the coded system specifically shown. These relays together thus establish a minimum timing sequence for the successive code steps. The second code receiver relay also directly drives the coding unit, the contacts of its front and back contact repeaters being used in the driver circuits as an extra check on proper reception. The driver circuits are of the capacitor form generally used to drive the office line relay in such carrier current control systems. The contacts of the front and back contact repeaters of the receiving relay thus serve to limit the length of the charging pulse into the capacitor used.

Further defining the form of my invention herein shown, other contacts of the front and back contact repeater relays are used in the energizing and stick circuits for the second line repeater or code receiving relay. This arrangement acts to hold this second receiving relay in each of its operating positions for at least the length of a normal short code step, the slow release characteristics of the contact repeater relays assuring this operation. At the same time, the first code receiving relay repeats directly the code following operation of the carrier receiver relays. The first relay thus operates freely to repeat directly the operation of the carrier receiver relay and is free to receive the code steps exactly as received over the communication channel. The second relay is controlled to repeat the operation of the carrier receiver relay and receive the code steps only as the incoming code remains within the limits established by the slow release repeater relays, i.e., the code steps at least as long as a normal short step. Thus, if a spurious pulse is introduced into the communication channel and received at the office, the first and second code receiving relays occupy out-of-correspondence positions. This closes a circuit to energize a pulse disagreement relay which is then held until the code unit completely resets to its normal at-rest condition. The pulse disagreement relay, depending upon the circuit conditions under which the spurious pulses are received, picks up or holds up the second receiving relay to lock out the coding unit and thus the office location. This causes the indication code then being transmitted to be rejected and the coding action terminated at both the office and at the transmitting station. In the usual manner of such systems, the lockout causes the dropout and resetting of the entire system under synchronized conditions so that the at-rest condition is reached simultaneously at the office and at the various stations and the indication code may again be transmitted from the transmitting station.

I shall now describe the detailed operation of the one form of the circuit arrangement of my invention shown in the accompanying drawing and shall then point out the novel features thereof in the appended claims.

Referring again to the drawing, there is shown, partly in conventional manner and partly in diagrammatic form, a remote control system, and particularly the office location, which incorporates a circuit arrangement embodying one form of my invention. Across the top of the drawing, illustrated in conventional block and single line form, are two remote station locations A and B and the office location of this system, the three installations being connected by a communication channel. As shown, the channel extends from station A to station B and thence to the office location. This channel is of a carrier current type frequently used in such remote control systems and the carrier terminals at each location are shown by a conventional solid line rectangle appropriately designated. The carrier channel may be provided by space radio, microwave, or any other well-known type of apparatus over which the actual carrier circuits which transmit the intelligence in this illustrated system are carried from the stations to the office.

These carrier circuits are coded at the originating station to transmit the desired information. Coding is controlled at each station by a normally open contact of a field carrier transmitter relay RL, that is, at station A by a contact 11 of carrier transmitter relay ARL and at station B by contact 12 of the corresponding carrier transmitter relay BRL. At each station, the associated relay RL is controlled by coding units of the remote control system in a manner similar to that shown in Letters Patent of the United States No. 2,350,668 issued June 6, 1944, to George W. Baughman and Norman F. Agnew for a Remote Control System. Relay RL may be controlled also in a manner similar to that shown in the Manual 507 entitled "Coded Carrier Control System," as revised and reprinted in March 1947 by the Union Switch & Signal, Division of Westinghouse Air Brake Company.

The control arrangements shown in these two publications are similar, but it is from Manual 507 that the relay designation RL is taken. The present system differs from that shown in either of these reference publications in that it is assumed that each station in the present system has a separate carrier circuit by which its indications are transmitted over the common communication channel to the office. Also in the present system, a separate carrier circuit is used as a transmission means for the control codes from the office to the various stations. However, the control circuit is not involved in the arrangement of my invention and is not specifically discussed here in detail. It will, however, be appreciated by those skilled in the art that the communication system actually used may vary. The necessary modifications in the circuitry required in order to use other forms of carrier channels will be obvious to those skilled in the art by reference to the principles taught by the aforementioned Baughman and Agnew patent and Manual 507.

The office location is provided with a carrier receiver relay for each carrier circuit terminating at that location. In the present specific showing, there is thus an office carrier receiver relay for each station, relays AOC and BOC corresponding respectively to stations A and B. For purposes of the specific description, it is assumed that carrier current is normally transmitted from the station location during the at-rest condition of the system. It is further assumed that, under the condition of steady carrier current being received at the office terminal, relays AOC and BOC are normally energized. When a code is transmitted from a station, the carrier transmitter is periodically shunted by the contact of the associated RL relay to halt the transmission of the corresponding carrier current. The absence of carrier current at the office terminal in either circuit causes the corresponding office carrier receiver relay OC to release. It is obvious, of course, that this operation may be reversed so that the office relays OC are normally deenergized. Also, other forms of carrier terminals may be used in which the absence of carrier current causes the energization of the associated relay. Such modifications are well known in the art and it is to be understood that the system of my invention includes such variations in the carrier circuits and channels.

Since relays AOC and BOC are code following relays so that they will quickly release when deenergized, the movable portion of their contacts is shown dotted in the released position to indicate that at times these contacts are periodically following code. The solid line representation in the energized position of the movable portion of the contacts is a conventional symbol used to indicate that these relays are normally energized but at times follow code. The contacts of other code following relays shown in the drawing are likewise represented by similar contact symbols although the position of the solid line may be reversed depending upon whether the relay is normally energized or normally deenergized.

The office location is provided with a local source of a direct current energy to provide power for the operation of the various relays. While this source of direct current energy may take various forms, it is herein shown as a battery 13, of the proper size and capacity, which has a positive terminal B, a negative terminal N, and a center tap terminal O. Where these conventional reference characters appear elsewhere in the circuit arrangement, it is to be understood that they designate a connection to the corresponding terminal of battery 13. Another conventional symbol is used throughout this circuit drawing to designate those relays which are provided with slow release characteristics. This symbol comprises a downward pointing arrow drawn through the movable portion of each contact of these relays.

The office is further provided with indication circuit fault relays, one for each indication carrier circuit, herein designated by the references AICF and BICF, corresponding to the carrier circuits from stations A and B, respectively. These fault relays are normally energized over front contacts of the corresponding OC relay. For example, relay AICF is energized over front contact 14 of relay AOC while relay BICF is energized over front contact 15 of relay BOC. Each of the fault relays is provided with slow release characteristics and is further snubbed, to extend the release period, by a capacitor-resistor element connected in multiple with the relay winding in the usual manner. The slow release period of these relays is so adjusted that they will bridge an entire indication code if necessary and thus easily hold up during normal coding action of the associated OC relay. Release of either of the fault relays indicates that the corresponding carrier circuit is interrupted so that carrier current is no longer being received. The release of the relay will normally be further marked by audible and visual indicators which are not herein shown since they do not enter into the system of my invention.

Since each station in the specific system here described is provided with a separate carrier circuit and there is thus a separate carrier receiver relay at the office for each station, a selection must be made as to which indication code will be accepted by the office equipment if simultaneous indication code starts occur at the various stations. Thus the office is provided with location selection relays which are herein designated as relays ALS and BLS, corresponding to stations A and B, respectively. The energized LS relay determines which station will prevail in transmitting its indication code for reception at the office location. Energizing circuits for these selection relays are thus selected and arranged by station superiority. For example, the energizing circuit for relay ALS may be traced from terminal B at front contact 16 of pole-changing relay PC over back contact 17 of a bridging stick repeater relay LBSP, back contact 18 of relay AOC, front contact 19 of relay AICF, and the winding of relay ALS to terminal N.

Relay PC is located within the office coding unit which is indicated by the dot-dash rectangle in the lower right of the drawing, designated by the reference character OLC. This coding unit and the circuits therein may be similar to that shown in Letters Patent of the United States No. 2,442,603 issued to me on June 1, 1948, for a Remote Control System. Since this prior patent completely describes the operation of such a unit, it is believed sufficient to here show only such details and provide such description as is necessary for an understanding of the present invention, reference being made to my prior patent for the complete details of operation of the coding unit. It is necessary to understand only that relay PC is energized at the beginning of the first step of an indication code and remains energized until the final step, the relay being held energized so that its front contacts are closed during the entire coding action. Similarly, the bridging stick relay OLBS of the timing chain of the coding unit is likewise energized during the first step of an indication code, but after relay PC picks up, and remains energized until the unit is completely reset at the end of the code. Thus its front contacts remain closed and its repeater relay LBSP, here provided outside the coding unit, is held energized during the entire coding action over front contact 20 of relay OLBS. It is to be here noted that the relays inside the coding unit are designated by reference characters similar to those used in my prior patent for convenient reference thereto.

When energized during the initial step of an indication code from station A by the previously traced energizing circuit, relay ALS picks up and completes a stick circuit over its own front contact 21 which initially includes front contact 16 of relay PC and then the multiple path over front contact 17 of relay LBSP to terminal B. If the indication code originates at station B, the circuit for relay BLS is completed by the closing of back contact 22 of relay BOC, the circuit otherwise including front contact 23 of relay BICF, front contact 18 of relay AOC, back contact 17 of relay LBSP, and front contact 16 of relay PC. The stick circuit for relay BLS includes, in addition to its own front contact 24, back contact 21 of relay ALS and, in multiple, front contacts 16 and 17 of relays PC and LBSP, respectively. It is to be noted that if relay ALS is energized so that its back contact 21 is open, the stick circuit for relay BLS is interrupted and the energization of relay ALS thus prevails so that simultaneous code starts from the two stations will result in the office accepting the code from station A. Full details of this function will appear shortly as the description proceeds.

It is to be noted that an alternate energization circuit for relay BLS is provided for use in the event that the carrier circuit from station A is interrupted by a fault for a period sufficient to allow the release of relay AICF. Under these conditions, the energizing circuit for relay BLS includes back contact 18 of relay AOC and back contact 19 of relay AICF rather than front contact 18 of relay AOC. Also under these conditions, the energizing circuit for relay ALS is open at front contact 19 of relay AICF. Although energized initially by the release of relay AOC when the fault occurs, relay ALS is deenergized and releases when its stick circuit is interrupted by the release of relays PC and LBSP as the result of the reset action of unit OLC when no further code is received. The stick circuit for relay BLS may then be completed over back contact 21 of relay ALS so that relay BLS is held energized during the coding action from station B. Front contact 22 of relay BOC and back contacts 23 and 24 of relays BICF and BLS, respectively, to which no connections are shown, provide energizing and stick circuits for other location selection relays in the event that additional stations are provided in the system.

It is to be understood that once a station has been selected at the office for reception of an indication code, the system remains synchronized by the retransmission of the received indication code over the common control carrier circuit used in the specific system herein described. This retransmission of an indication code coordinates the operation of the selected station to permit it to advance from code step to code step and locks out other code stations. This lockout occurs for those stations which are not transmitting a code by holding the coding unit inactive. At any other station which may be attempting to transmit a code simultaneously, the code superiority used in such systems results in the station coding unit failing to agree with the retransmitted code and dropping out until such time as the communication channel is again free for its use. This operation is usual for such coded carrier remote control systems. A similar system operation is illustrated, for example, in Letters Patent of the United States No. 2,735,083 issued February 14, 1956, to Alexander Finlay for Coded Carrier Remote Control Systems. Reference is made to this prior patent for a complete description of the synchronization of the system by the retransmitted indication code. It is sufficient to here understand that once a station location has been selected at the office for the reception of its code, all other stations are locked out from transmitting indication codes, in one manner or another, until the completion of the prevailing code.

As part of my invention, the office is provided with repeaters of the carrier receiver relays OC, herein designated as relays OCP1 and OCP2, these relays preferably being termed code receiving relays. Relay OCP2 is provided with two windings for purposes which will appear hereinafter. Relay OCP1 repeats directly the exact operation of either relay AOC or relay BOC, depending upon which location selection relay is energized. This repeating action, however, is interrupted, as will be apparent shortly, when a line fault occurs which results in the release of the corresponding indication circuit fault relay. A first circuit for relay OCP1 may be traced from terminal B over back contact 25 of relay BLS, front contact 26 of relay AICF, back contact 27 of relay AOC, and the winding of relay OCP1 to terminal N. The second control circuit for relay OCP1 extends from terminal B at back contact 28 of relay ALS over front contact 29 of relay BICF, back contact 30 of relay BOC, and the winding of relay OCP1 to terminal N. It is apparent that the first circuit is effective when relay AOC is receiving a code and the second circuit effective when relay BOC is receiving a code. Each control circuit checks over a back contact of the opposite location selector relay LS to assure that relay OCP1 is to be controlled by that circuit. It is obvious from the traced control circuits that relay OCP1 is a direct back contact repeater of whichever OC relay is operating at the time.

Relay OCP2 normally repeats the operation of the OC relays in the same manner as relay OCP1. The initial control circuit for energizing relay OCP2 branches from the circuits just traced for relay OCP1 and extends over back contact 31 of a pulse disagreement relay PD, back contact 32 of repeater relay OCPFP, and the upper winding of relay OCP2 to terminal N. An alternate control circuit and stick circuits for this latter relay will be traced later in the description after a discussion of some of the other features added by my invention. It is to be noted at this time that the operation of relay OCP2 to control its contact 33 causes the retransmission of the received indication code over the control carrier circuit. The control of the carrier terminal at the office under these conditions is shown conventionally by a dotted line 34 since this control does not enter into the operation of the circuits of my invention. It is sufficient to understand that the control arrangement does exist and is effective under these conditions.

The apparatus of my invention also includes two contact repeater relays which repeat the operation of relay OCP2. Repeater relay OCPFP repeats the closing of front contacts of relay OCP2 while repeater relay OCPBP repeats the closing of back contacts of the code receiving relay. Relays OCPFP and OCPBP are energized by simple circuits which extend between terminals B and N of battery 13 and include front and back contacts 35, respectively, of relay OCP2. Each of these contact repeater relays is provided with slow release characteristics which are further magnified by a half-wave rectifier connected in multiple with each relay winding. The release time of each of these relays is so adjusted as to encompass a time period slightly less than the usual short code step in the time code system herein used, which is fully described in my aforementioned prior Patent No. 2,442,603.

During the code following operation of relay OCP2, as controlled by either relay AOC or relay BOC, its contact repeater relays are alternately energized. Relay OCPBP is normally energized over back contact 35, becomes deenergized when relay OCP2 picks up, and releases later during this carrier-off pulse of an indication code. Relay OCPFP is normally deenergized and becomes energized when relay OCP2 picks up. Upon release of relay OCP2 when the controlling OC relay is energized by a carrier-on pulse, relay OCPFP is deenergized and the opposite relay OCPBP is reenergized. Relay OCPFP, of course, holds its front contacts closed until the completion of its slow release period. Thus the front contact repeater is energized each time relay OCP2 picks up, which action deenergizes the back contact repeater which releases just prior to the completion of a short Off code step. Conversely, the release of relay OCP2 energizes its back contact repeater and deenergizes its front contact repeater which then releases just prior to the completion of the corresponding short On code step. Said in another way, relays OCPFP and OCPBP are alternately energized to repeat, respectively, the odd and even numbered code steps but conversely establish, by their delayed release periods, minimum time periods for, respectively, the even and odd numbered steps.

Another relay which is added by the arrangement of my invention is the pulse disagreement relay PD. This relay is provided with two energizing circuits, either of which is completed only if relays OCP1 and OCP2 occupy out-of-correspondence positions during coding action. A first of these energizing circuits includes front contact 36 of relay OCP1 and back contact 37 of relay OCP2 while the other circuit includes back contact 36 and front contact 37, each energizing circuit otherwise extending between terminals B and N and including the winding of relay PD. When energized, relay PD picks up, closing its own front contact 38 to complete a stick circuit which otherwise includes front contact 39 of relay LBSP. This latter contact is closed near the end of the first code step, as previously described, repeating the operation of bridging stick relay OLBS within unit OLC. It is apparent therefore that, once energized, relay PD is held energized by its stick circuit until coding unit OLC resets and releases its entire timing chain ending with the release of relay OLBS, which in turn causes the release of relay LBSP.

I shall return now to the description of the stick circuits and an alternate energizing circuit for relay OCP2. When this relay is energized upon the initial release of either of the OC relays at the beginning of an indication code, the closing of front contact 41 of relay OCP2 completes an initial stick circuit which also includes front contact 40 of relay OCPBP. This stick circuit holds relay OCP2 energized when back contact 32 of relay OCPFP opens shortly after the former relay picks up. When relay OCPBP releases at the end of its slow release period, having been deenergized by the opening of back contact 35 of relay OCP2, another stick circuit is completed for relay OCP2 which includes back contact 40 of relay OCPBP, front contact 32 of relay OCPFP which is closed prior to this time, back contact 31 of relay PD, and thence to terminal B over one of the two multiple paths which include, respectively, back contact 27 of relay AOC or back contact 30 of relay BOC. Contact 40 of relay OCPBP is of the continuity transfer type, as indicated by the conventional short arc appended to the end of the movable portion of this contact, and thus the energization of the lower winding of relay OCP2 is not interrupted during the transfer from front to back contact 40 of relay OCPBP.

This second stick circuit for relay OCP2 is interrupted at the beginning of the following code step when the active OC relay is reenergized and opens its back contact. Relay OCP2 thus releases at this time, deenergizing its front contact repeater and reenergizing its back contact repeater. Since the release time of front contact repeater OCPFP is slightly less than the duration of a normal short code step in the system herein shown, this relay will release and close its back contact 32 prior to the beginning of the succeeding code step when either back contact 27 or 30, of relay AOC or BOC, respectively, closes to reenergize relay OCP2, and also, as previously decribed, relay OCP1. It is obvious, therefore, that the code repeating action of relay OCP2 is controlled, by the combined operation of relays OCPFP and OCPBP, to follow the incoming code only so long as the code steps match at least the minimum time sequence established by these front and back (odd and even) repeater relays.

If relay PD is energized and picks up during the period that relay OCPFP is released, a second energizing circuit for relay OCP2 is completed from terminal B over front contact 31 of relay PD, back contact 32 of relay OCPFP, and the upper winding of relay OCP2 to terminal N. Under these conditions, relay OCP2 is initially held energized by the stick circuit through its lower winding which includes front contact 40 of relay OCPBP. When this latter relay releases, the stick circuit is transferred to back contact 40 and thence over front contact 32 of relay OCPFP, which is now closed, to terminal B at front contact 31 of relay PD. This stick circuit retains relay OCP2 energized until relay PD releases which, as previously described, will not occur until coding unit OLC has reset to its at-rest condition. If relay PD is energized and picks up when relay OCPFP is already energized, this last traced stick circuit is immediately completed, or at least will be completed shortly by the release of relay OCPBP, and will thus retain relay OCP2 energized until the reset action of the coding unit and system is complete.

Prior to describing the actual operation of the circuit arrangement of my invention, I shall complete such description of the remote control apparatus and system as is believed necessary in order to understand my invention. Within unit OLC is shown, in addition to the previously described relays, master relay OM, transmitter relay OT, and office line relay OR, all of which are also shown with complete operating circuits in my previously-mentioned prior patent. The reference characters here shown are identical with those used in that patent for easy cross reference, Briefly, relay OR drives the coding unit through the operation of its contacts 42 and 43 between their normal and reverse positions in order that the timing and counting chains of the unit may operate properly to receive the indication code. Relay OR is of the magnetic stick type having two windings. It is a characteristic of such relays that the flow of current through either or both windings in the direction of the arrow shown within the winding symbol causes the relay contacts to be operated to their left-hand or normal position closing normal contacts. The flow of current through either or both windings of the relay in the reverse direction, that is, opposite to the arrow, causes the relay contacts to be closed in reverse positions. When the relay windings are deenergized, contacts remain in the position to which they were last operated. Briefly reviewing further, relay OM is energized to initiate a control code and remains energized during the entire control code. During the reception of indication codes, relay OM remains deenergized and in its released position. Transmitting relay OT is operated by local circuits including contacts of the counting and timing chain relays to actually produce a control code. During indication codes, which is the existing condition for the present description, relay OT remains in its released position.

During the reception of an indication code, a first control circuit for relay OR is completed when relay OCP2 is energized. This circuit extends from terminal B over front contact 44 of relay OCP2 and back contact 45 of relay OCPFP to the left terminal of a capacitor C1, and from the other terminal of this capacitor over back contacts 46 and 47 of relays OM and OT, respectively, and the upper winding of relay OR in the direction opposite to the arrow to terminal O of the battery. When this circuit is completed, a charging pulse for capacitor C1 flows through the circuit including the upper winding of relay OR. This pulse is terminated by the opening of back contact 45 which occurs shortly after the closing of front contact 44. However, the pulse is of sufficient duration to cause relay OR to operate its contacts to their reverse position in which they will remain when the relay winding becomes deenergized.

During the code steps when carrier current is received at the office and relay OCP2 is deenergized and releases, a second control circuit is completed which includes back contact 48 of relay OCP2, back contact 49 of relay OCPBP, capacitor C1, back contacts 46 and 47 of relays OM and OT, respectively, and the upper winding of relay OR. When this circuit, which extends between terminals O and N of the battery, is completed, it is obvious that the charging pulse flows in the direction of the arrow through the upper winding of relay OR, causing this relay to operate its contacts to their normal position. The duration of the pulse is limited by the opening of back contact 49 of relay OCPBP. It is apparent that, as relay OCP2 is alternately energized and deenergized by successive code steps, closing alternately its front contact 44 and its back contact 48, relay OR is energized by pulses of current flowing alternately in opposite directions through its upper winding so that its contacts 42 and 43 operate periodically between their reverse and normal positions to drive unit OLC to receive the code.

During the transmission of control codes, the circuit through the upper winding of relay OR is interrupted at least at back contact 46 of relay OM which is energized during the transmission of control codes. Relay OR is then controlled by the circuits through its lower winding which include front and back contacts 50 of relay OT and front contact 51 of relay OM. Although it does not enter into the operation of the circuits of my invention, it may be briefly said that the periodic operation of contact 50 of relay OT between its front and back contacts causes opposite pulses of current to alternately flow through the lower winding of relay OR, through obvious circuits, to drive the relay which in turn drives the counting and timing chains to advance the coding action of unit OLC. Under these conditions, carrier transmitter relay TC is controlled by a circuit including front contact 52 of relay OT, back contact 53 of relay PC, and the winding of relay TC. Relay TC is alternately energized and deenergized by coding action of contact 52 of relay OT. In turn, operation of relay TC, to periodically close its front and back contacts 54, drives the office carrier terminals, through the connections shown conventionally by dotted line 34, to transmit the control code. A more complete understanding of this operation, which is not involved in the system of my invention, may be had by reference to the previously mentioned Baughman and Agnew Patent No. 2,350,668 and Manual 507. Various other circuits not involved in my invention and including back contact 51 of relay OM and contacts 55 and 56 of relays OT and PC, respectively, are indicated by conventional dotted lines. These connections serve for purposes of reset and synchronization of the entire system at the end of various coding actions and during the reset action after fault conditions in the communication channel. Again, for a complete understanding of these circuits, reference is made to the aforementioned patents and publication for circuit and operational descriptions.

I shall now describe the operation of the code-check circuit arrangement of my invention. I shall assume that the system including stations A and B is at-rest so that the apparatus is in the condition in which it is shown in the drawing. I shall further assume that an indication code is initiated at station A for transmission to the office location.

This indication code is transmitted by the coded operation of relay ARL, which periodically closes and opens its front contact 11 to shunt and restore the carrier current carrying indications from station A to the office over the communication channel. This code is received at the office by the operation of relay AOC which is periodically deenergized and reenergized to open and close all of its front contacts, the operation of corresponding back contacts being in the converse manner. During this code following operation of relay AOC, it will be understood that relay AICF remains with its front contacts closed since its slow release period is of such duration that it is periodically reenergized prior to the release of its armature. Stated in another manner, it may be said that since we are not presently concerned with a complete interruption of the carrier circuit from station A, fault indication relay AICF remains in its energized position.

The initial release of relay AOC during the first code step to close its back contact 27 energizes relays OCP1 and OCP2, the code receiving relays at the office. The circuit for relay OCP1, which was previously discussed in detail also includes back contact 25 of relay BLS and front contact 26 of relay AICF. The circuit for relay OCP2, in addition to back contacts 25 and 27 and front contact 26, further includes back contact 31 of relay PD, back contact 32 of relay OCPFP, and the upper winding of relay OCP2. The closing of front contact 44 of relay OCP2 due to the energization of this relay completes a circuit to charge capacitor C1. This pulse of current also flows through the upper winding of relay OR in the direction opposite to the arrow so that this relay operates its armature to close reverse contacts to begin the reception of the indication code. Through the operation of unit OLC, as described in my prior patent, relay PC is energized and picks up.

The closing of front contact 16 of relay PC completes the circuit, also including back contact 17 of LBSP, back contact 18 of relay AOC, and front contact 19 of relay AICF, to energize relay ALS to select station A as the location from which a code will be received at the present time. Relay ALS closes its front contact 21 to complete its stick circuit arrangement, first including front contact 16 of relay PC and shortly including also front contact 17 of relay LBSP. This latter relay is energized during the first code step by the operation of the timing chain relays within unit OLC, ending in the energization of relay OLBS and the closing of its front contact 20. The opening of back contact 28 of relay ALS interrupts the control circuit for relays OCP1 and OCP2 which extends over back contact 30 of relay BOC and renders this latter relay ineffective to control the code receiving relays in the event that an indication code was also originated at station B. In addition, the opening of back contact 21 of relay ALS interrupts the stick circuit for relay BLS so that this latter relay cannot remain energized under these conditions, thus assuring the selection of only one station location for the reception of its code.

The closing of front contact 33 of relay OCP2 causes the retransmission of this first indication code step over the control carrier circuit. The continued operation of contact 33 between its back and front positions, as the indication code is received at the office, also retransmits the entire indication code over the control carrier circuit to synchronize the operation of the system and to permit the apparatus at station A to advance its coding action. This retransmission also locks out station B from initiating the transmission of an indication code or causes it to hold a simultaneously originated code until the completion of the present operation. For purposes of the rest of the operational description herein, however, this retransmission will be omitted as it does not specifically enter into the operation of the apparatus of my invention.

When relay OCP2 picks up, the closing of its front contact 35 energizes relay OCPFP which immediately picks up. The opening of back contact 35 deenergizes relay OCPBP which, however, holds its front contacts closed for its slow release period which, as previously mentioned, is slightly less than the usual short code step in the system being used. Relay OCP2 is held energized by the stick circuit, including its own front contact 41 and lower winding, completed over front contact 40 of relay OCPBP. The opening of back contact 45 of relay OCPFP interrupts the control circuit presently active for relay OR, this latter relay, however, remaining with its contacts in their reverse position. When relay OCPBP releases, opening its front contact 40 and closing the corresponding back contact, the stick circuit for relay OCP2 is transferred, over front contact 32 of relay OCPFP, to the control of back contact 27 of relay AOC.

When the first step of the indication code terminates and the second step begins, relay AOC is reenergized and picks up to open its back contact 27. This interrupts the then effective stick circuit for relay OCP2 and this relay immediately releases jointly with the release of relay OCP1, which is deenergized also at this time. The closing of back contact 48 of relay OCP2 completes the second control circuit for relay OR, which also includes the now closed back contact 49 of relay OCPBP. The flow of current to charge capacitor C1 through this second circuit is in the direction of the arrow through the relay winding and relay OR operates its armature to close normal contacts. The opening of front contact 35 of relay OCP2 deenergizes its front contact repeater relay OCPFP and the closing of the corresponding back contact reenergizes the back contact repeater relay which immediately picks up. Relay OCPFP, although deenergized, retains its front contacts closed for its slow release period which is also slightly less than the usual short code step of the system. When relay OCPFP does release and closes its back contact 32, the circuit is prepared for reenergizing relay OCP2 at the beginning of the third code step.

When relay AOC is deenergized and releases at the beginning of this third code step, closing its back contact 27, the relay action previously described for the first code step repeats. In other words, relays OCP1 and OCP2 are energized and pick up. The operation of relay OCP2 drives relay OR to its reverse position and reenergizes and deenergizes, respectively, relays OCPFP and OCPBP. As the code continues, the reception operation previously described repeats alternately as relay AOC is reenergized and deenergized on successive code steps. This action is repeated, through the circuit operation described, by relay OR to drive unit OLC to receive the code. If no circuit or coding faults occur, the indication code is completed, the indications received are registered by the office apparatus, and the system then resets to its normal at-rest position in synchronism as is shown and described in previously mentioned references.

I shall now assume that shortly after the beginning of one of the carrier-off code steps during which relay AOC is released, a momentary circuit fault occurs of the nature which causes relay AOC to be reenergized and then deenergized in short order. This spurious pickup and release of relay AOC under these conditions creates, as far as the office apparatus is concerned, a succession of very short code steps. As previously described, when relay AOC released at the beginning of this normal carrier-off step, relays OCP1 and OCP2 were energized and picked up. Relay OCP2 picking up caused the energization of relay OCPFP, and although relay OCPBP was deenergized, its front contacts are still closed due to its slow release characteristics. Relay OCP2 is held energized under these conditions by the stick circuit including front contact 40 of relay OCPBP and front contact 41 and the lower winding of relay OCP2. Thus, the spurious pickup of relay AOC, as the result of the circuit fault, deenergizes relay OCP1 which quickly releases. However, the operation of relay AOC has no effect upon relay OCP2 which is held by its stick circuit. Relay OCP1, of course, will pick up again at the completion of this fault code step when relay AOC again closes its back contact 27.

However, when relay OCP1 releases with relay OCP2 held up, a circuit is completed for energizing pulse disagreement relay PD. At this time, the circuit includes back contact 36 of relay OCP1 and front contact 37 of relay OCP2. Being energized, relay PD picks up closing its front contact 38 to complete its stick circuit which also includes front contact 39 of relay LBSP which is already closed. Relay PD, once picked up, thus remains energized until unit OLC is reset which results in the release of relay LBSP.

When relay PD picks up, it transfers the control of relay OCP2 to terminal B at front contact 31 of relay PD. Thus, when relay OCPBP releases at the end of its slow release period and closes its back contact 40, relay OCP2 is retained energized by its alternate stick circuit including front contact 31 of relay PD and front contact 32 of relay OCPFP which is held closed because relay OCP2 retains this relay energized. With relay OCP2 held energized, the operation of relay OR is halted and does not continue even though station A may transmit the next code step.

With relay OR held in its reverse position to which it was operated when relay OCP2 closed its front contact 44, unit OLC drops out after a time interval, locked in its reverse position by relay OR held reversed. This drop-out operation is fully described in my prior patent. With relay OCP2 held energized, code retransmisison likewise is halted so that station A cannot continue its coding action beyond the next code step since the retransmitted code is not received to advance its coding action. The apparatus at station A likewise drops out under these conditions. The drop-out of unit OLC at the office eventually results in the release of relay OLBS of the timing chain which opens its front contact 20 to deenergize relay LBSP which likewise releases. The opening of front contact 39 of relay LBSP deenergizes relay PD which releases to open its front contact 31 thus deenergizing relay OCP2 since back contact 27 of relay AOC is open at this time. Relay OCP2 releases, closing its back contact 48 to energize relay OR in a manner to close its normal contacts. The closing of back contact 33 of relay OCP2 likewise transmits a synchronizing step to the station to allow it to reset under normal conditions. Office coding unit OLC, with relay OR operated to its normal position, resets to an at-rest condition, the reset action being synchronized with that of station A so that the entire system returns to its normal condition simultaneously. Since the indication code was not completed, station A again initiates the coding action to transmit the desired indications.

I shall now assume that during a carrier-on indication code step, shortly after relay AOC picks up, a circuit fault briefly interrupts the carrier circuit from station A so that relay AOC is momentarily deenergized, releasing for a very short time and then picking up again. When relay AOC initially picks up for this code step, relays OCP1 and OCP2 are deenergized by the opening of back contact 27 of relay AOC and these two code receiving relays release. The release of relay OCP2 reenergizes relay OCPBP and deenergizes relay OCPFP in the usual manner. The latter relay, however, holds its front contacts closed for its slow release period. When relay AOC momentarily releases during the duration of the circuit fault, relay OCP1 is reenergized by the closing of back contact 27 of relay AOC. However, the usual energizing circuit for relay OCP2 is open at back contact 32 of relay OCPFP which has not completed its slow release period. The alternate circuit for relay OCP2 is open at back contact 40 of relay OCPBP and thus relay OCP2 is not reenergized at this time and remains in its released condition. With relay OCP1 picked up and relay OCP2 released, the other circuit is completed for energizing pulse disagreement relay PD. This circuit includes front contact 36 of relay OCP1 and back contact 37 of relay OCP2. When relay PD picks up, it completes its usual stick circuit including front contact 39 of relay LBSP. This holds relay PD energized when its energizing circuit is interrupted at front contact 36 of relay OCP1 upon the deenergization of this latter relay when relay AOC again picks up at the end of the circuit fault pulse.

When relay OCPFP eventually releases, relay OCP2 is immediately energized regardless of the position of relay AOC. This circuit extends from terminal B over front contact 31 of relay PD, back contact 32 of relay OCPFP, and the upper winding of relay OCP2 to terminal N. Relay OCP2 immediately picks up, reenergizing relay OCPFP and deenergizing back contact repeater OCPBP, which, however, holds for its slow release period. Relay OCP2 is then held energized by its stick circuit over front contact 40 of relay OCPBP. When this latter relay releases closing its back contact 40, the stick circuit for relay OCP2 is transferred over front contact 32 of relay OCPFP to terminal B at front contact 31 of relay PD which remains closed. Relay OCP2 is thus held energized as long as relay PD remains with its front contacts closed.

When relay OCP2 picks up under these conditions, relay OR is as usual driven to its reverse position by the previously traced energizing circuit. However, with relay OCP2 remaining in this position, relay OR likewise remains in its reverse position so that unit OLC drops out under reverse conditions without registering an indication. This action is described, as previously mentioned, in my prior patent. With relay OCP2 held picked up, the retransmitted code halts and station A likewise halts its coding operation and drops out under reverse conditions in a similar manner. The eventual release of relay OLBS in unit OLC releases its repeater relay and thus, in turn, relay PD. The opening of front contact 31 of relay PD deenergizes relay OCP2 which releases, driving relay OR normal and likewise transmitting a reset pulse to drive station A apparatus to its normal position. The system then resets under normal conditions with coding unit OLC at the office and the similar equipment at the station resetting to the at-rest condition simultaneously. The system is thus reset and the indication code may again be initiated by station A for transmission and reception at the office in a correct manner.

It is thus apparent that the circuit arrangement of my invention provides the means of detecting the reception of incorrect code steps at the office location and the locking-out of the system under these conditions. The slow release repeater relays of the second code receiving relay detect the reception of an unusually short code step and causes an out-of-correspondence condition between the positions of the two code receiving relays. This results in the locking-out of the office coding unit so that it resets to normal. At the same time, the station originating the code is also forced to halt its coding action and reset to an at-rest condition. This lock-out operation prevents the reception of incorrect codes at the office and the registry of improper indications into the recording equipment. This operation is automatic and does not require supervision by the system operator. Since improper indications resulting from momentary circuit faults are thus avoided, the over-all operation of the system is simplified and confusion and uncertainty are eliminated.

Although I have herein shown and described but one form of a code check circuit arrangement of my invention, it is to be understood that various changes and modifications may be made therein within the scope of the appended claims without departing from the spirit and scope of my invention.

Having thus described my invention, what I claim is:

1. In combination with a coded remote control system including at least one remote location connected with a code receiving station by a communication channel, at the code receiving station thereof, code receiving means having connections to said channel for receiving a code transmitted from a remote location; relay means controlled by said receiving means for establishing a correct timing sequence for the successive code steps of each received code and controlling the channel connections to said receiving means for dividing said receiving means into a freely operating portion and a controlled operating portion, said freely operating portion repeating identically each received code, said controlled portion as controlled by said relay means being responsive only to a received code having a correctly timed code pattern; and disagreement means controlled by said receiving means for detecting out-of-correspondence conditions between said freely operating portion and said controlled portion, said disagreement means having connections to said receiving means for halting the reception of a code when an out-of-correspondence condition is detected.

2. In combination, at the receiving station in a coded remote control system including a plurality of remote transmitting locations connected to said receiving station by a communication channel, a first code receiving relay having connections to said channel and controlled thereby to be responsive to each code received over said channel, a second code receiving relay having connections to said channel and controlled thereby to be normally responsive to received codes, a front contact repeater relay and a back contact repeater relay of said second receiving relay alternately energized when said second relay operates during a received code, said repeater relays having slow release characteristics to hold front contacts closed for a selected period after deenergization, contacts of said repeater relays being interposed in the channel connections of said second receiving relay to hold that relay in each operated position for said selected period, a pulse disagreement relay and an energizing circuit therefor including contacts of said receiving relays closed in series when said receiving relays are operated to out-of-correspondence positions during a received code by a code pulse shorter than said selected period, a front contact of said disagreement relay also being interposed in said second receiving relay channel connections to hold said second relay energized to interrupt its code following action and effect rejection of the received code if an incorrect short pulse is received at said receiving station.

3. In a coded remote control system including a code receiving location and a plurality of remote locations connected by a communication channel, said remote locations at times transmitting stepped codes which are received by a coding unit at said receiving location, apparatus for locking out said coding unit if an incorrect short code step is received, said lock-out apparatus including a receiving relay means having connections to said channel for operation by a received code, said receiving relay means having a first and a second portion which normally operate jointly between a first and a second position as said receiving relay means is operated by a code; a repeater relay means controlled for repeating the operation between said first and said second positions of said second portion of said receiving relay means, said repeater relay means having slow release characteristics to hold in each position for a predetermined time interval longer than an incorrect short step after said second portion has operated to the opposite position; a driving circuit arrangement having connections to said unit and including contacts controlled by said repeater relay means and contacts controlled by said second portion to drive said unit to receive a code, other contacts controlled by said repeater relay means being interposed in said channel connections to hold said second portion of said receiving relay means in each position for said predetermined time interval; a disagreement relay and an energizing circuit therefor completed only if said first and said second portion of said receiving relay means operate out-of-correspondence during the reception of a code, and a contact of said disagreement relay also interposed in said channel connections for interrupting the joint operation of said second portion to effect lock-out of said unit.

4. In combination with a coding unit for receiving stepped codes transmitted over a communication channel from a remote location, a first and a second receiving relay each operable to a first and a second position, each receiving relay having connections to said channel to be operated alternately to said first and said second positions by successive steps of a received code, a first position and a second position repeater relay of said second receiving relay, each repeater relay being energized over a contact closed only when said second receiving relay occupies the corresponding position, said repeater relays having slow release characteristics to hold energized position contacts closed for a predetermined time interval after deenergization, contacts of said repeater relays being interposed in the channel connections of said second receiving relay to hold that relay in each operated position for the duration of said time interval, a pulse disagreement relay and an energizing circuit arrangement therefor including contacts of said first and said second receiving relay closed in series to complete a circuit path only if said receiving relays occupy out-of-correspondence positions due to the reception of a code step shorter than said time interval, a contact of said disagreement relay being interposed in said second receiving relay channel connections to hold said second receiving relay energized if said disagreement relay becomes energized, and a driving circuit arrangement for said coding unit including front and back contacts of said second receiving relay and contacts of said repeater relays to normally energize said unit in step with a received code and to lock out said unit if said second receiving relay is held energized.

5. In combination at the code receiving station of a coded remote control system including at least one remote station connected by a communication channel with said code receiving station, code receiving relay means having connections to said channel for receiving a code transmitted from a remote station and divided into a controlled operating portion and a free operating portion, said free operating portion directly repeating a received code, a timing relay means controlled by said controlled operating portion for establishing a correct time length of each received code step, said timing relay means controlling the channel connections of said controlled portion for effecting a continued response by said controlled portion only to a correct time pattern of received code, a code registry means controlled by said controlled portion for registering a received code, a disagreement relay and an energizing circuit therefor including a circuit portion controlled jointly by both portions of said code receiving means and completed only when an out-of-correspondence condition between said free and said controlled portions of said code receiving means occurs during reception of a code, and a holding circuit means controlled by an energized position contact of said disagreement relay and having connections for holding said controlled portion of said code receiving means in a selected condition to halt the registration of a received code.

6. In a coded remote control system including a code receiving location and a plurality of remote locations connected by a communication channel, said remote locations at times transmitting stepped codes which are registered at said receiving location by a coding unit, apparatus at said receiving location for locking out said coding unit if an incorrect short code step is received, comprising, a first and a second receiving relay each operable to a first and a second position, circuit means with connections to said channel for normally controlling said receiving relays in multiple to operate between their first and second positions in accordance with a code received over said channel from a remote location, a first repeater relay energized by the closing of first position contacts of said second receiving relay, a second repeater relay energized by the closing of second position contacts of said second receiving relay, each repeater relay having a slow release period equal to a correct short code step to time the length of the succeeding code step, contacts of said repeater relays being interposed in the connections to said channel to control said circuit means for holding said second receiving relay in each position at least the length of a correct short code step, a control circuit arrangement for said coding unit including first and second position contacts of said second receiving relay to drive said coding unit to register a received code when said second receiving relay alternately closes its first and second position contacts, a disagreement relay and an energizing circuit therefor including first and second position contacts of said first and said second receiving relays arranged to complete the circuit when an out-of-correspondence condition occurs between said first and said second receiving relays during the reception of a code, a stick circuit for said disagreement relay including a contact controlled by said unit and closed during code reception until said unit resets to its normal at-rest condition, and a lock-out energizing circuit for said second receiving relay including a front contact of said disagreement relay.

7. At an information registering location of a remote control system, said registering location being connected with at least one remote station by a communication means over which information is transmitted from said station to said registering location, the combination comprising, an information receiving means having connections to said communication means for receiving information transmitted from said station and divided into a freely operating portion and a controlled operating portion, said freely operating portion being directly responsive to the received information, a repeater means controlled by said receiving means and responsive to the received information for establishing a correct pattern of received information, said controlled operating portion being controlled by said repeater means for continuously responding only to received information of the correct pattern, and disagreement means controlled by said receiving means for detecting variation between the response to received information of said freely and said controlled operating portions and having connections to said receiving means for interrupting the reception of information when a variation is detected.

8. In combination with a coded remote control system including a communication channel connecting a code receiving location and at least one remote location, a receiving relay means having connections for receiving a code over said communication channel from said remote location, said receiving relay means being divided into a received code portion and a correct code portion, said received code portion being directly responsive to a received code, a timing relay means controlled by said receiving relay means for timing the successive code steps of each received code, said timing relay means having connections to said correct code portion for effecting a correct code receiving operation thereby, and a disagreement means controlled by both portions of said receiving relay means for detecting a variance between the code receiving operation of said received code portion and said correct code portion, said disagreement means having connections for halting the reception of a code when a variance is detected.

9. In a coded remote control system including a plurality of code transmitting remote stations and a receiving location connected by a communication channel, at said receiving location the combination comprising; a code receiving relay means having connections to said channel for receiving each code transmitted from a remote station, said relay means being divided into a received code portion and a correct code portion, said received code portion receiving each code exactly from said channel; a code registry means controlled by said relay means for registering and recording a received code, a timing means controlled by said correct code portion of said relay means for timing the successive steps of each received code, said timing means controlling the channel connections of said correct code portion for effecting the reception of a correctly timed code only, and a disagreement means controlled by said relay means for detecting any variation in the received code from a correctly timed code, said disagreement means having connections to said relay means for halting the registry of the received code when a variation is detected.

10. At an information registering location of a remote control system, said registering location being connected with at least one remote station by a communication means over which information is transmitted from said station to said registering location, the combination comprising, an information receiving means having connections to said communication means for receiving information transmitted from said station and divided into a freely operating portion and a controlled operating portion, said freely operating portion being directly responsive to the received information, a repeater means controlled by said receiving means and responsive to the received information for establishing a correct pattern of received information, said controlled operating portion being controlled by said repeater means for continuously responding only to received information of the correct pattern, a registry means controlled by said controlled operating portion of said receiving means and by said repeater means for registering the received information as long as said controlled operating portion responds thereto, and a disagreement means controlled by said receiving means for detecting any variation between the response of each portion thereof to received information, said disagreement means having connections for halting the response of said controlled operating portion to received information to interrupt the registry of that information when a variation is detected.

References Cited in the file of this patent

UNITED STATES PATENTS

| | | |
|---|---|---|
| 2,623,939 | Derr | Dec. 20, 1952 |
| 2,679,034 | Albrighton | May 18, 1954 |
| 2,708,744 | Neiswinter | May 17, 1955 |